(12) United States Patent
Itsuji et al.

(10) Patent No.: US 12,313,731 B2
(45) Date of Patent: May 27, 2025

(54) PROCESSING SYSTEM

(71) Applicant: CANON KABUSHIKI KAISHA, Tokyo (JP)

(72) Inventors: Takeaki Itsuji, Hiratsuka (JP); Takahiro Sato, Ebina (JP); Yasushi Koyama, Kamakura (JP); Toshifumi Yoshioka, Hiratsuka (JP); Eiichi Takami, Chigasaki (JP); Noriyuki Kaifu, Atsugi (JP); Jun Iba, Yokohama (JP); Rei Kurashima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 76 days.

(21) Appl. No.: 18/305,804

(22) Filed: Apr. 24, 2023

(65) Prior Publication Data
US 2023/0258793 A1    Aug. 17, 2023

Related U.S. Application Data

(62) Division of application No. 16/815,153, filed on Mar. 11, 2020, now abandoned.

(30) Foreign Application Priority Data

Mar. 14, 2019  (JP) .................... 2019-047789
Feb. 27, 2020  (JP) .................... 2020-032195

(51) Int. Cl.
   *G01S 13/88*     (2006.01)
   *G06N 3/084*     (2023.01)
   (Continued)

(52) U.S. Cl.
   CPC ............ *G01S 13/887* (2013.01); *G06N 3/084* (2013.01); *G06V 10/143* (2022.01); *G06V 10/25* (2022.01);
   (Continued)

(58) Field of Classification Search
   CPC .............. H04N 5/2256; H04N 5/2258; H04N 5/23296; H04N 5/247; G06N 3/084;
   (Continued)

(56) References Cited

U.S. PATENT DOCUMENTS 4,816,828 A    3/1989  Feher
5,164,827 A    11/1992 Paff
(Continued)

FOREIGN PATENT DOCUMENTS

CN    102353998 A    2/2012
CN    102759753 A    10/2012
(Continued)

OTHER PUBLICATIONS

European Search Report issued Jul. 31, 2020 in European Application No. 20162322.0.
(Continued)

*Primary Examiner* — Shadan E Haghani
(74) *Attorney, Agent, or Firm* — VENABLE LLP

(57) ABSTRACT

A processing system comprising a first imaging system configured to capture a first image based on a terahertz wave from an inspection target, a second imaging system configured to capture a second image of the inspection target based on an electromagnetic wave of a wavelength different from the terahertz wave, and a processor configured to process the first image and the second image, wherein the processor detects an inspection region based on the second image and processes information of a region of the first image corresponding to the inspection region.

21 Claims, 12 Drawing Sheets

(51) Int. Cl.
| | |
|---|---|
| *G06V 10/143* | (2022.01) |
| *G06V 10/25* | (2022.01) |
| *H04N 23/45* | (2023.01) |
| *H04N 23/56* | (2023.01) |
| *H04N 23/69* | (2023.01) |
| *H04N 23/90* | (2023.01) |
| *G06N 3/04* | (2023.01) |
| *G06V 10/44* | (2022.01) |

(52) U.S. Cl.
CPC ............. *H04N 23/45* (2023.01); *H04N 23/56* (2023.01); *H04N 23/69* (2023.01); *H04N 23/90* (2023.01); *G06N 3/04* (2013.01); *G06V 10/454* (2022.01)

(58) Field of Classification Search
CPC ......... G06N 3/04; G01S 7/417; G01S 13/867; G01S 13/89; G01S 13/887; G06K 9/4628; G06K 9/2018; G06K 9/3233; G01V 8/10
See application file for complete search history.

(56) References Cited

U.S. PATENT DOCUMENTS

| | | | |
|---|---|---|---|
| 7,342,230 | B2 | 3/2008 | Adamski |
| 7,345,279 | B2 * | 3/2008 | Mueller ............ G01N 21/3581 250/341.1 |
| 7,800,527 | B2 | 9/2010 | Douglass |
| 9,599,511 | B2 | 3/2017 | Ando |
| 9,658,104 | B2 | 5/2017 | Treado |
| 9,996,772 | B2 | 6/2018 | Ahmed |
| 10,452,947 | B1 | 10/2019 | Ahmed |
| 10,713,794 | B1 | 7/2020 | He |
| 10,762,733 | B2 | 9/2020 | Bergdale et al. |
| 11,293,860 | B2 | 4/2022 | Zheng |
| 2004/0056790 | A1 | 3/2004 | Loveberg et al. |
| 2004/0065831 | A1 | 4/2004 | Federici |
| 2005/0110672 | A1 | 5/2005 | Cardiasmenos |
| 2007/0211922 | A1 | 9/2007 | Crowley |
| 2009/0072146 | A1 | 3/2009 | Youngner et al. |
| 2010/0148071 | A1 | 6/2010 | Shioda |
| 2010/0194625 | A1 | 8/2010 | Koch |
| 2011/0056134 | A1 | 3/2011 | Zacchio |
| 2011/0102233 | A1 | 5/2011 | Johnson |
| 2011/0121209 | A1 | 5/2011 | Thiel et al. |
| 2012/0092493 | A1 | 4/2012 | Tsutsui |
| 2013/0114855 | A1 | 5/2013 | Kane |
| 2013/0146770 | A1 | 6/2013 | Jun |
| 2014/0028457 | A1 | 1/2014 | Reinpoldt |
| 2014/0043488 | A1 | 2/2014 | Treado |
| 2014/0172374 | A1 | 6/2014 | Brady et al. |
| 2014/0231648 | A1 | 8/2014 | Kotter et al. |
| 2014/0231649 | A1 | 8/2014 | Zhao |
| 2014/0361169 | A1 * | 12/2014 | Tomioka ............... G01J 5/0853 250/338.3 |
| 2016/0078576 | A1 | 3/2016 | Su et al. |
| 2016/0332717 | A1 | 11/2016 | Guering |
| 2018/0013985 | A1 | 1/2018 | Lee et al. |
| 2019/0020811 | A1 | 1/2019 | Tzuang |
| 2019/0238741 | A1 | 8/2019 | Atkinson |
| 2019/0259791 | A1 | 8/2019 | Itsuji et al. |
| 2021/0072419 | A1 | 3/2021 | Birnkrant |

FOREIGN PATENT DOCUMENTS

| | | | |
|---|---|---|---|
| CN | 202966665 | U | 6/2013 |
| EP | 2204671 | A | 7/2010 |
| EP | 3287816 | A | 2/2018 |
| JP | H10-105748 | A | 4/1998 |
| JP | 2003-117009 | A | 4/2003 |
| JP | 2004-286716 | A | 10/2004 |
| JP | 2008-509385 | A | 3/2008 |
| JP | 2010-156697 | A | 7/2010 |
| JP | 2012-69022 | A | 4/2012 |
| JP | 2016-156801 | A | 9/2016 |
| JP | 2018-156586 | A | 10/2018 |
| JP | 2018-199434 | A | 12/2018 |
| JP | 2020-144692 | A | 9/2020 |
| KR | 20090049159 | A | 5/2009 |
| WO | 99/21148 | A1 | 4/1999 |
| WO | 2006-13379 | A2 | 2/2006 |
| WO | 2008/086124 | A1 | 7/2008 |
| WO | 2016/170231 | A1 | 10/2016 |
| WO | 2019/004812 | A1 | 1/2019 |

OTHER PUBLICATIONS

Japanese Office Action issued Dec. 1, 2023 during prosecution of related Japanese application No. 2020153975 (English-language machine translation included.).

Chinese Search Report issued Mar. 1, 2024 in corresponding Chinese Patent Application No. 202010165221.X (English translation included).

Chinese Office Action issued Sep. 23, 2023 during prosecution of related Chinese Application No. 2020-10165221.X (English language machine translation not available).

* cited by examiner

FIG. 7
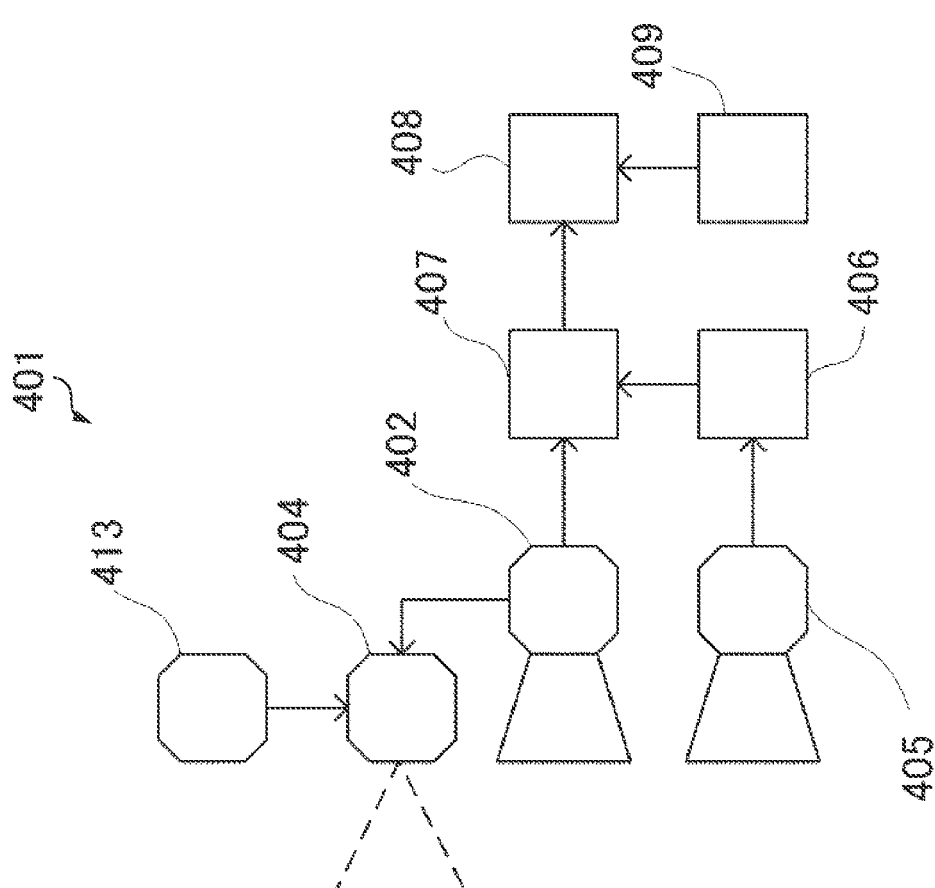
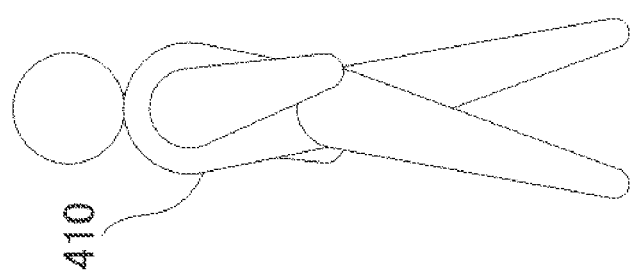

FIG. 8
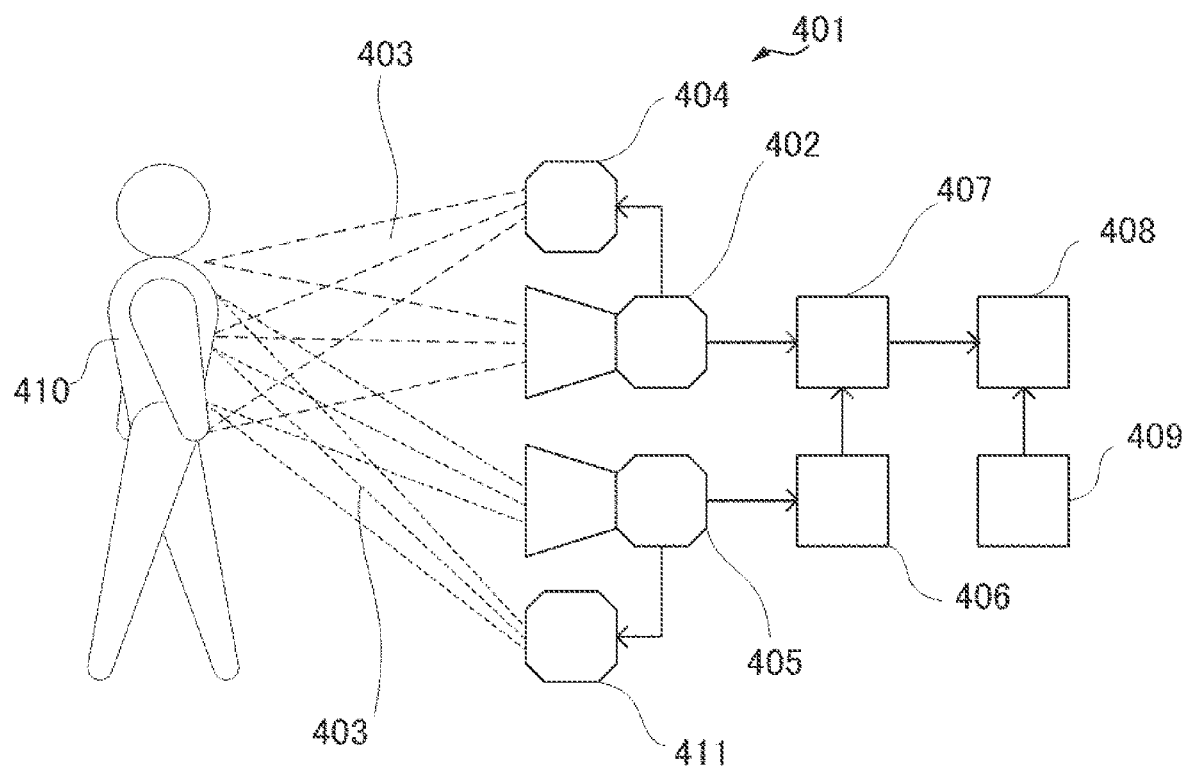
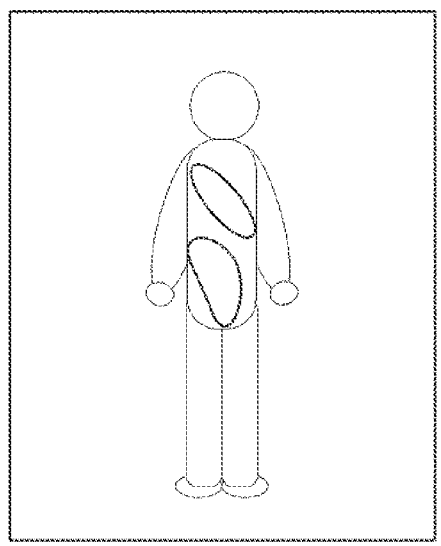
CAPTURING 2
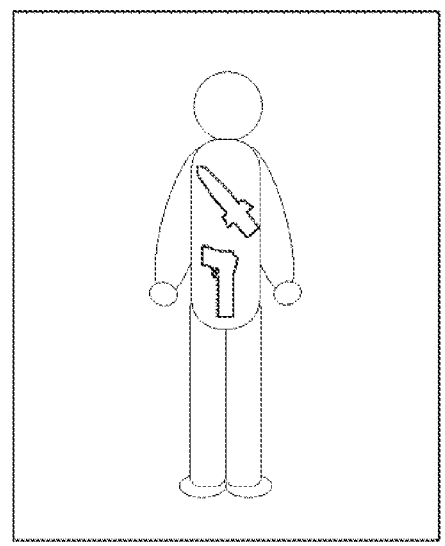
CAPTURING 1

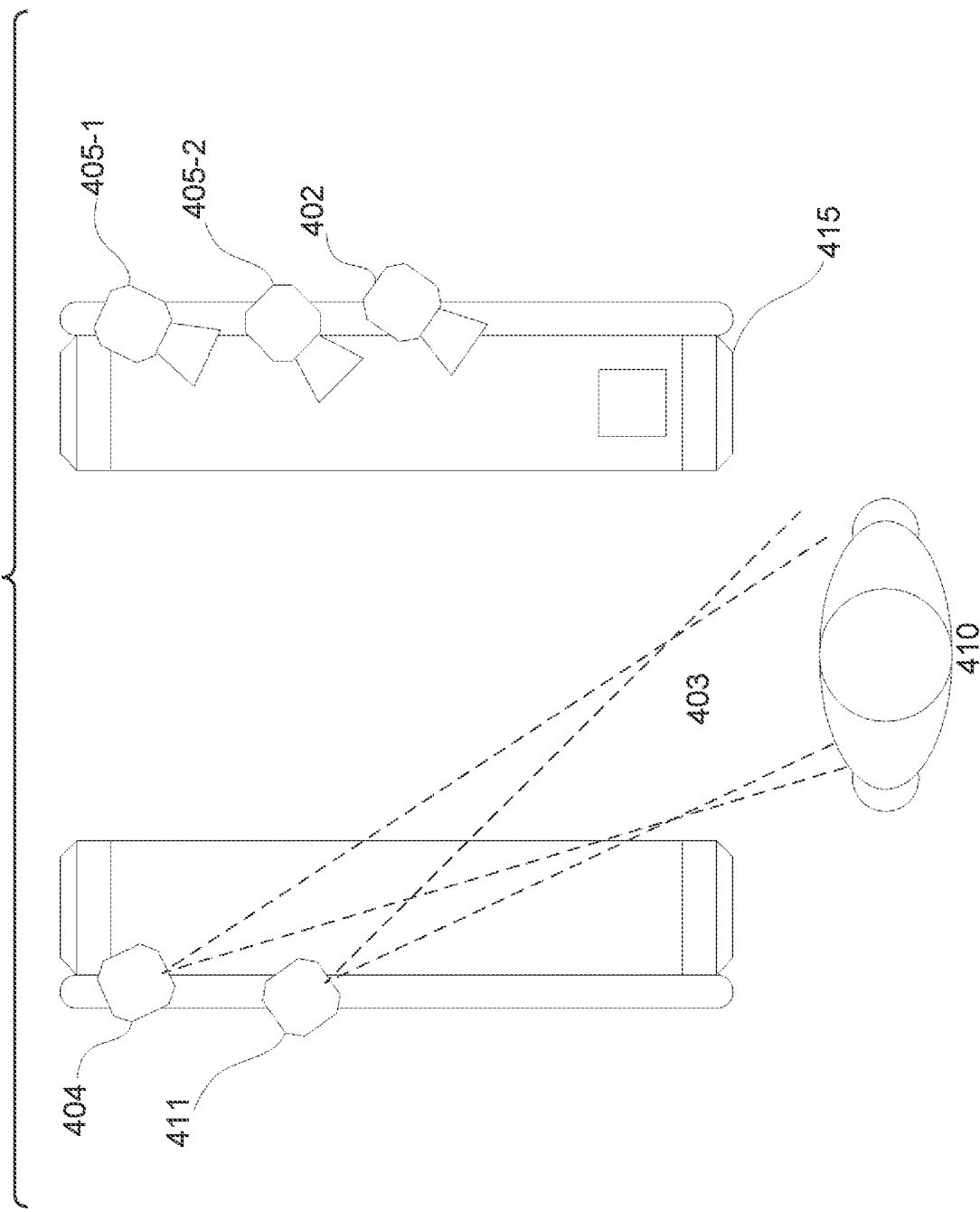

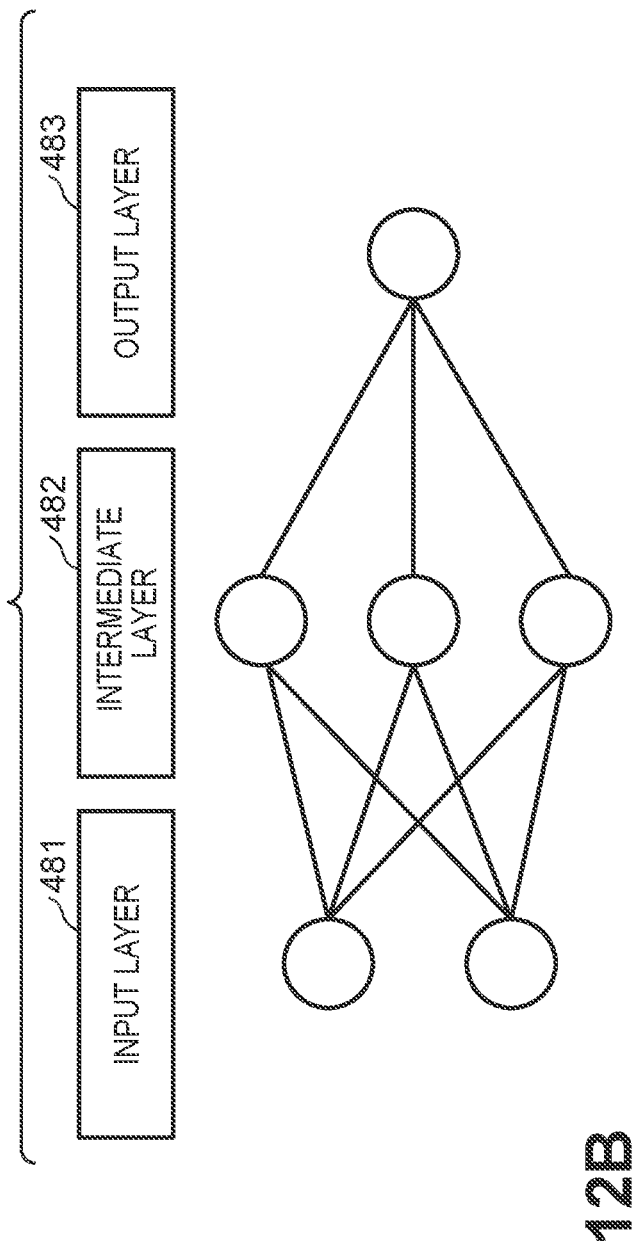
F I G. 12A
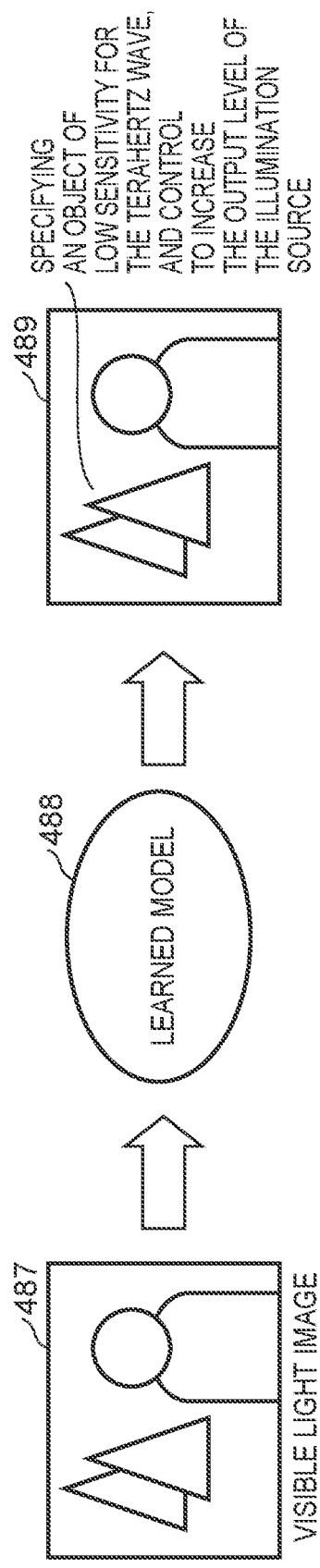
F I G. 12B

PROCESSING SYSTEM

This application is a divisional of U.S. application Ser. No. 16/815,153, filed Mar. 11, 2020, currently pending; and claims priority under 35 U.S.C. § 119 to Japanese Applications JP 2019-047789, filed Mar. 14, 2019 and JP 2020-032195, filed Feb. 27, 2020; the contents of each of which are incorporated by reference herein.

BACKGROUND OF THE INVENTION

Field of the Invention

The present invention relates to a processing system including an imaging system.

Description of the Related Art

An inspection technique using a terahertz wave is known. Japanese Patent Laid-Open No. 2004-286716 discloses a method of inspecting a prohibited drug such as a narcotic drug enclosed in a sealed letter.

When processing an image acquired by a terahertz wave for inspection, it may be impossible to obtain a sufficient information amount because of the positional relationship between an inspection target and a detection unit or the movement of the inspection target. In addition, when inspecting a dressed person, scattering may occur due to clothes, or propagation of terahertz waves may be impeded by the environment. Therefore, sufficient inspections may be impossible.

SUMMARY OF THE INVENTION

The present invention has been made in consideration of the above situation, and provides a processing system capable of more advantageously executing an inspection using a terahertz wave.

According to the first aspect of the present invention, there is provided a processing system comprising a first imaging system configured to capture a first image based on a terahertz wave from an inspection target; a second imaging system configured to capture a second image of the inspection target based on an electromagnetic wave of a wavelength different from the terahertz wave, and a processor configured to process the first image and the second image, wherein the processor detects an inspection region based on the second image and processes information of a region of the first image corresponding to the inspection region.

Further features of the present invention will become apparent from the following description of exemplary embodiments with reference to the attached drawings.

BRIEF DESCRIPTION OF THE DRAWINGS

FIG. 7 is a conceptual view of a processing system according to the fourth embodiment;

FIG. 8 is a conceptual view of a processing system according to the fifth embodiment;

FIG. 10 is a view showing an arrangement example of the processing system;

FIG. 12A is a view showing an example of a model for machine learning; and

FIG. 12B is a view showing an example of control using a learned model.

DESCRIPTION OF THE EMBODIMENTS

Figure 1:
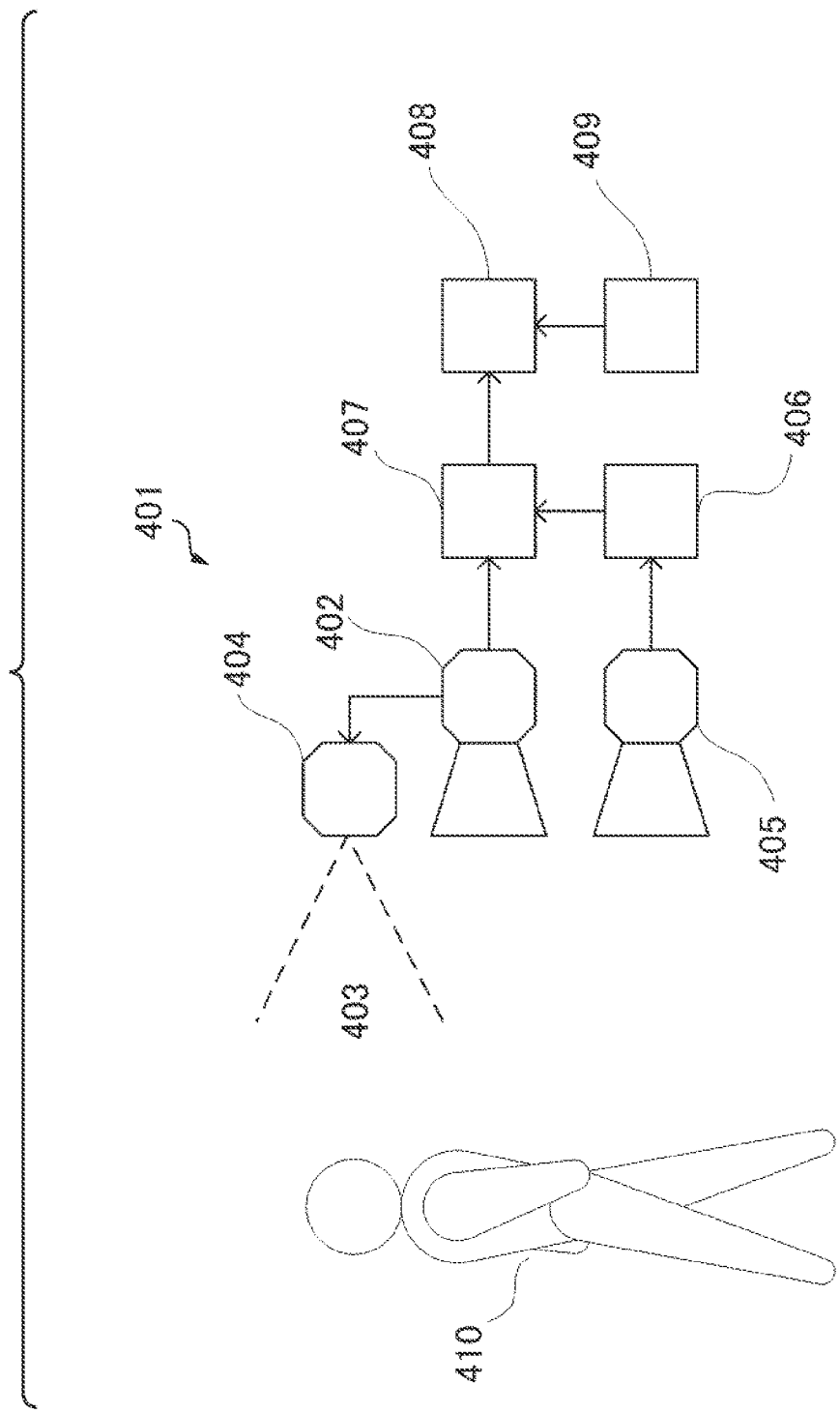
FIG. 1 is a conceptual view of a processing system according to the first embodiment.

Hereinafter, embodiments will be described in detail with reference to the accompanying drawings. It should be noted that the following embodiments are not intended to limit the scope of the appended claims. A plurality of features are described in the embodiments. Not all the plurality of features are necessarily essential to the present invention, and the plurality of features may arbitrarily be combined. Furthermore, the same reference numerals denote the same parts throughout the accompanying drawings, and a repetitive description thereof will be omitted. In the present invention, terahertz waves include electromagnetic waves within the frequency range of 30 GHz to 30 THz. The concept of electromagnetic waves can include visible light, infrared light, and a radio wave such as a millimeter wave.

First Embodiment

The outline of a processing system 401 according to the first embodiment will be described with reference to FIG. 1. The processing system 401 includes a first imaging system including a first illumination source 404 and a first camera 402, a second imaging system including a second camera 405, and a processor including a pre-processing unit 406 and a post-processing unit 407.

The first camera 402 of the first imaging system acquires a first image based on a terahertz wave 403 of a first wavelength radiated from the first illumination source 404. An inspection target 410 is irradiated with the terahertz wave 403 radiated from the first illumination source 404. If the inspection target 410 is a dressed person, the terahertz wave 403 passes through the fibers of clothes and is reflected by a metal or ceramic held by the inspection target 410. A specific substance, for example, RDX (trimethylenetrinitroamine) that is an explosive is known to absorb a terahertz wave near 0.8 THz, and therefore, the reflected wave decreases. The first camera 402 acquires the first image based on the reflected wave.

The second camera 405 of the second imaging system acquires a second image from an electromagnetic wave of a wavelength different from that of the terahertz wave irradiated from the first illumination source 404. As the electromagnetic wave of a different wavelength, visible light, infrared light, or a millimeter wave can be used. When using infrared light, an illumination source (not shown) different from the first illumination source 404 may be prepared. The second image acquired by the second camera 405 is processed by the pre-processing unit 406. The pre-processing unit 406 performs processing of detecting an inspection region from the second image.

If the second image is acquired by visible light, and the inspection target 410 is a person, detection of the inspection region may be performed by detecting a specific part of clothes as the inspection region. The inspection region may be specified by creating a model by machine learning and classifying a region of the captured second image by the model. Alternatively, the region may be specified based on the information of the shape of an object stored in a database 409. If the second image is acquired by a millimeter wave, a portion where the intensity distribution in the image is higher than a threshold or a portion where the intensity difference is large may be detected as the inspection region. If infrared light is used to acquire the second image, a portion with little radiation of infrared light caused by water or a specific portion of clothes in an image detected by night vision may be detected as the inspection region. Even in a dark place or a place with a poor view due to the weather, the inspection region can be detected using the infrared light or a millimeter wave. When detecting the inspection region from an image of a dressed person, an unnaturally swelling portion of clothes, the chest portion of the person, or a pocket portion of clothes may be detected as the inspection region.

Figure 2:
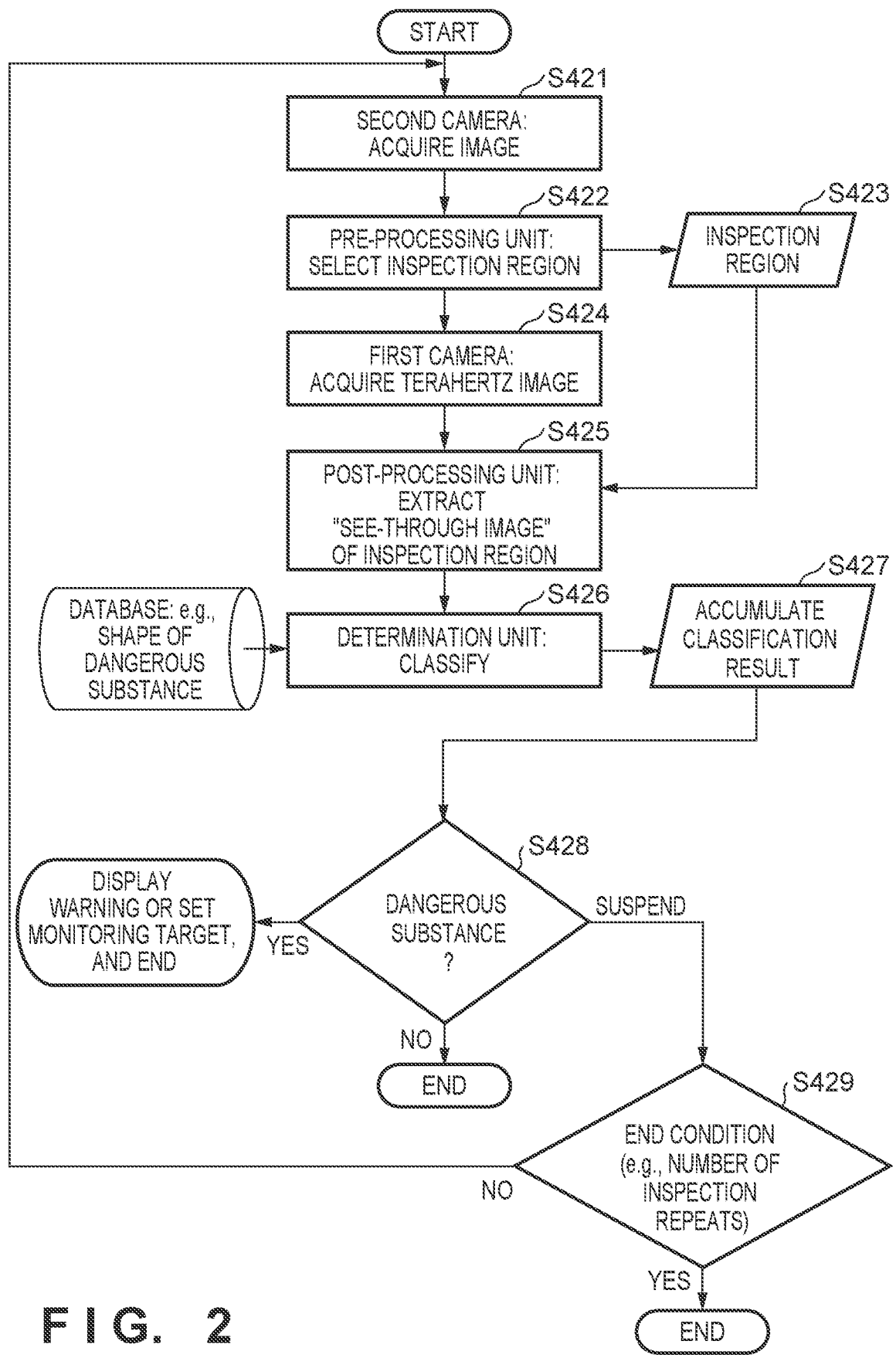
FIG. 2 is a flowchart of processing according to the first embodiment.

The inspection of the inspection target 410 by the processor will be described based on FIG. 2. The pre-processing unit 406 detects the inspection region from the second image acquired by the second camera 405 (step S421) by the above-described method (steps S422 and S423). The post-processing unit 407 performs processing of image data for the information of the region of the first image corresponding to the inspection region detected from the second image (step S425). The first image is an image acquired by the first camera 402 using a terahertz wave (step S424), and is an image obtained by seeing through clothes or the like. If a metal or ceramic object exists under the clothes, an image can be obtained from the reflected wave. Hence, the shape of the object can be detected by processing the first image. After the inspection region is detected from the second image, the region in the first image corresponding to the inspection region is selected by comparing the first image and the second image. Subsequent image processing for the first image is performed for the region corresponding to the inspection region detected from the second image.

When the region corresponding to the inspection region is selected from the first image, and image processing is performed, the processing can be performed while reducing unnecessary information. For this reason, the processing load can be reduced as compared to processing of the entire image data, and the speed can be increased. Hence, even if the inspection target 410 is moving, features can be detected from the first image a plurality of times in a short moving distance during a short time. A determination unit 408 estimates the object under the clothes based on the plurality of detected features (step S426). The plurality of features may be features of a part of the object. The determination unit 408 may classify the shape of the object detected from the first image based on the data in the database 409. The classification may be done using a model created by machine learning. It is considered that the information of the shape obtained from the image may be the information of a part of the object because of the movement of the inspection target 410 or the positional relationship between the inspection target and the camera. Even in this case, the estimation accuracy can be improved by classifying the features based on the information of the plurality of features, accumulating a plurality of results, and performing determination based on the accumulated classification results (step S427).

When the processing system is used in a security monitoring system, the risk of the object detected from the inspection region is determined based on the accumulation of the classification results for the inspection target 410 (step S428). As for the determination, determination based on the accumulation result of classifications may be performed based on a model by machine learning. If it is determined that the inspection target 410 holds a dangerous substance, it is possible to notify the outside that the inspection target 410 holds a dangerous substance. When the inspection target 410 passes through a gate in which the processing system is arranged, the processing system may notify the outside of a warning. When the inspection target 410 puts in a ticket and passes through a ticket gate, the processing system may link the ticket with the inspection target 410 and notify that the inspection target 410 is a monitoring target. If the second image is obtained using visible light, the inspection target 410 can be displayed such that it can easily be seen by displaying the second image and the first image on a monitor in a superimposed manner. When the determination is suspended, the inspection is repeated until the end condition is satisfied. The end condition may be the number of repetitions of the inspection (S429).

A method of specifying, from the second image acquired by the second camera 405, the inspection region using a model (artificial intelligence) created by machine learning will be described next in detail.

Figure 11A:
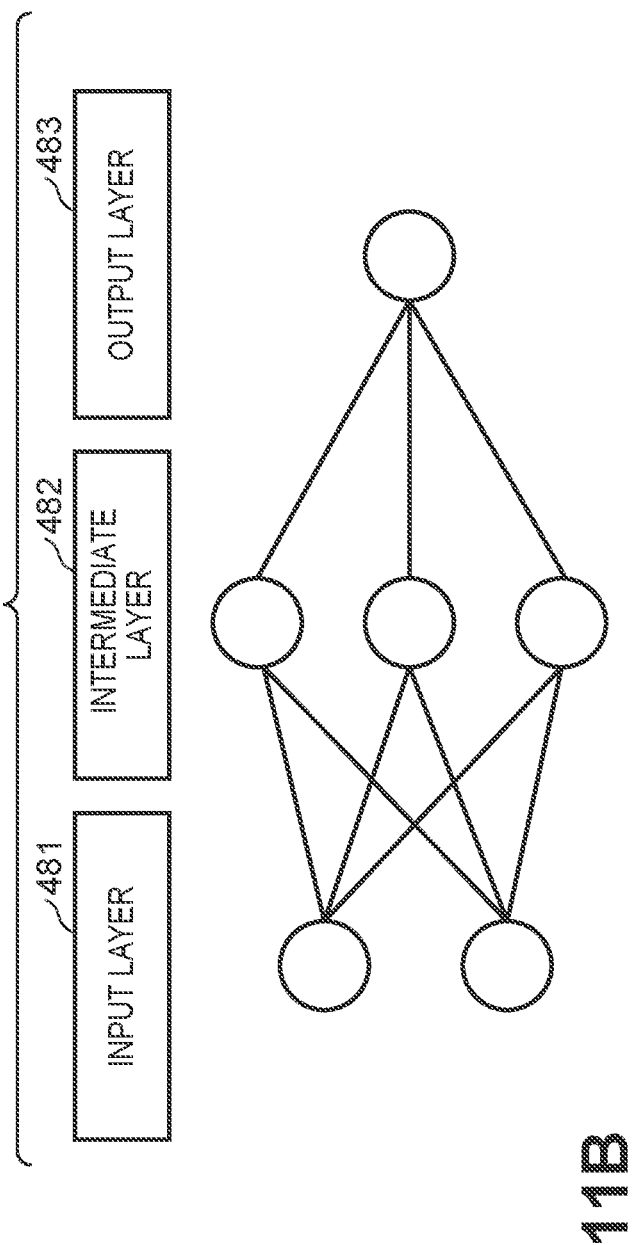
FIG. 11A is a view showing an example of a model for machine learning.

FIG. 11A is a view schematically showing a model for machine learning, that is, a learning model. In this example, a neural network including an input layer 481, an output layer 483, and at least one intermediate layer 482 is used as a learning model. Image data is input to the input layer 481. In addition, the output layer 483 outputs a feature amount indicating a partial region of the input image.

As a learning method of the learning model, supervisory data with a correct answer label can be used. That is, using a data group including a set of input image data and a label representing an inspection target region in the image data, the learning model is learned by a means such as backpropagation. The target region includes a person, a bag, a container, and the like, but is not limited to these. Learning by deep learning may be performed using a CNN (Convolutional Neural Network) as a model.

Figure 11B:
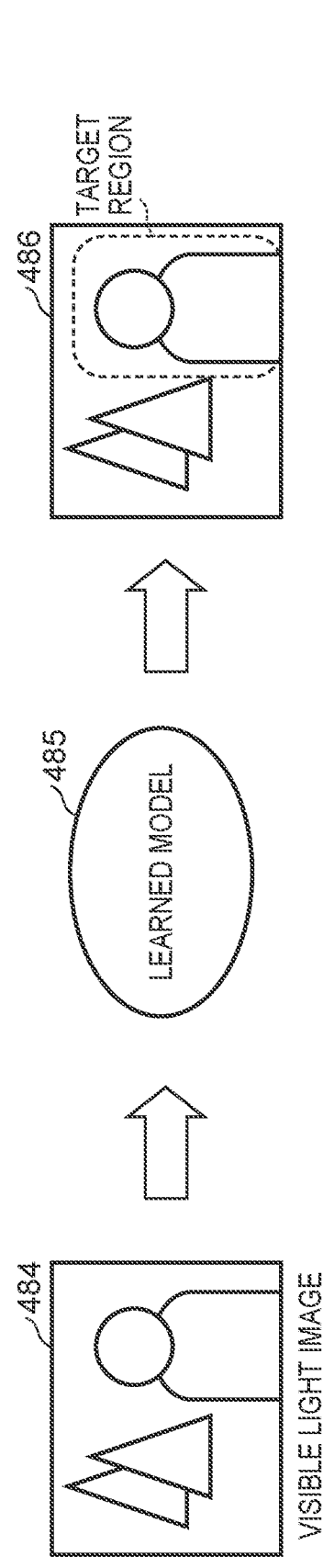
FIG. 11B is a view showing an example of an inspection using a learned model.

FIG. 11B is a schematic view showing a specifying method of an inspection region using a learned model. As an input, a visible light image 484 is input. A learned model 485 outputs a feature amount representing an inspection target region. As the form of output, for example, a target region in an image 486 is surrounded by a line, as shown in FIG. 11B. Alternatively, coordinate information for image processing may be output.

When determination using machine learning or artificial intelligence is performed in this way, accurate determination can be performed.

In addition, when detecting a specific target object from the first image, similarly, a model (artificial intelligence) created by machine learning may be used. In this case, as supervisory data for learning, an image of a terahertz wave having the same wavelength as the terahertz wave used by the first camera 402 for capturing is used.

Second Embodiment

Figure 3:
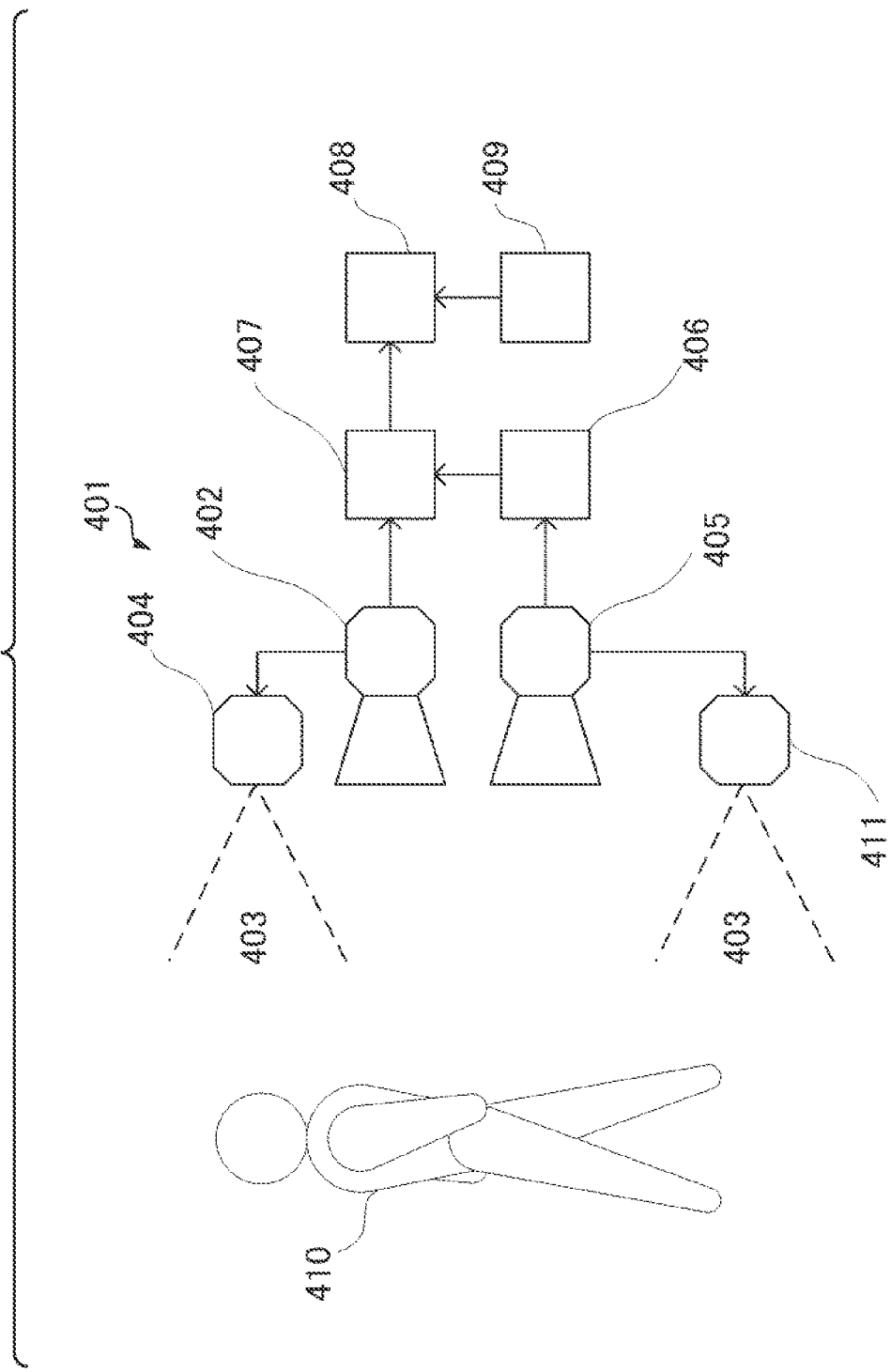
FIG. 3 is a conceptual view of a processing system according to the second embodiment.

In this embodiment, a second imaging system is provided with a second illumination source 411 that radiates a terahertz wave. This embodiment will be described with reference to FIG. 3. The second illumination source 411 is an illumination source that generates a terahertz wave of a second wavelength different from a first illumination source 404. As described in the first embodiment, there is known a specific substance that absorbs a terahertz wave of a specific wavelength. Hence, a terahertz wave of a first wavelength (about 0.8 THz for RDX that is an explosive) that is a wavelength the specific substance readily absorbs is radiated from the first illumination source 404 to an inspection target 410. If the inspection target 410 holds a substance with a characteristic to easily absorb the terahertz wave of the first wavelength, reflection in the portion where the substance is held become small. On the other hand, when a wavelength (about 0.5 THz when the first wavelength is 0.8 THz) that is little absorbed by the specific substance is selected as the terahertz wave of the second wavelength generated by the second illumination source 411, the specific substance reflects the terahertz wave of the second wavelength. The substance can be specified using the difference between reflected waves from the specific substance for the same inspection region.

Figure 4:
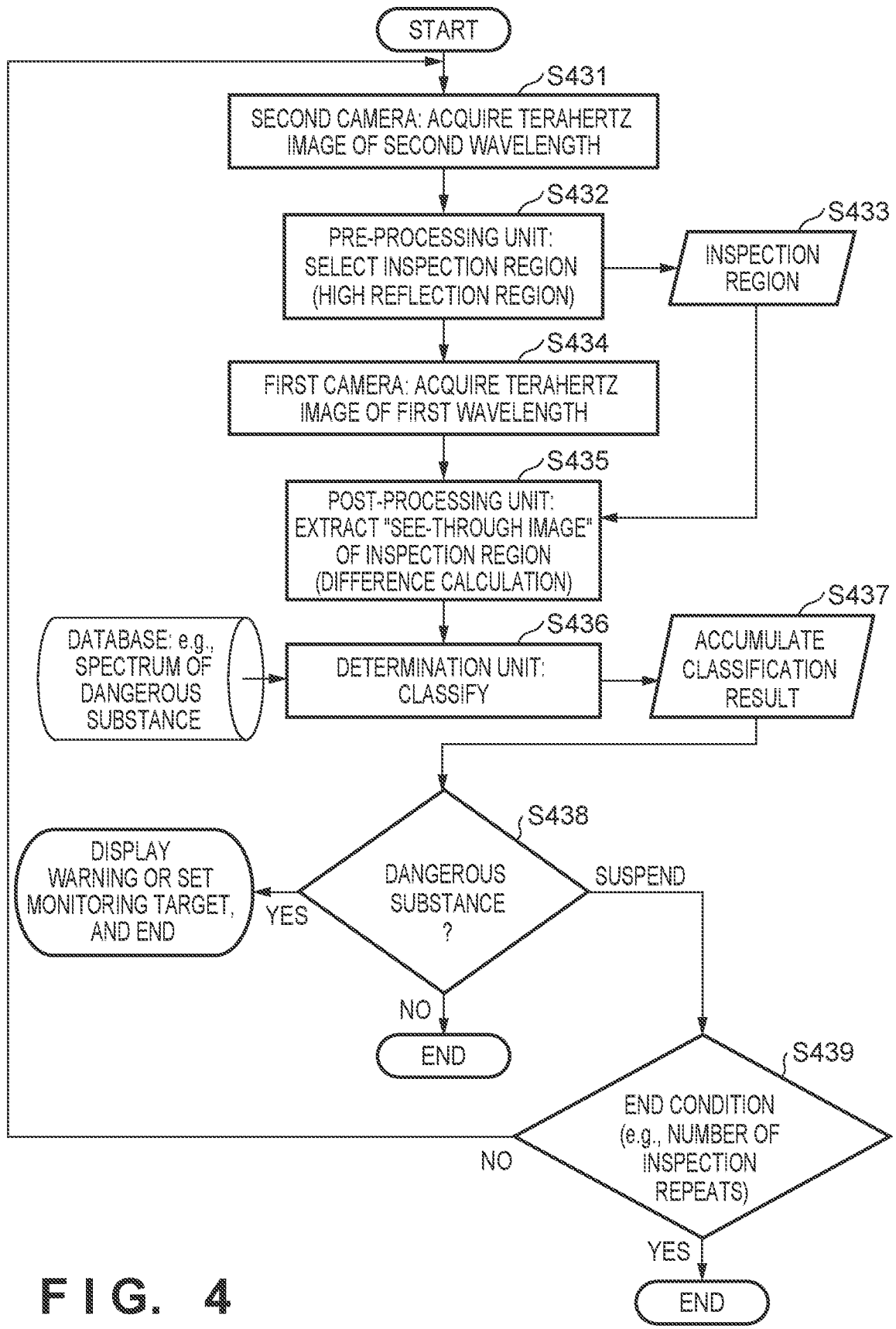
FIG. 4 is a flowchart of processing according to the second embodiment.

Processing according to this embodiment will be described based on FIG. 4. A pre-processing unit 406 detects, as the inspection region, a high reflection region in the second image acquired by the terahertz wave of the second wavelength (steps S431 and S432). A post-processing unit 407 acquires a first image (step S434) captured by a first camera 402 based on a terahertz wave of a first wavelength, and starts processing image data for a region of the first image corresponding to the inspection region detected from the second image. The post-processing unit 407 can calculate the difference between the information of the inspection region in the second image and the information of the region of the first image corresponding to the inspection region (step S435). Data of a portion where reflection and absorption in the second image are almost equal to those in the first image is almost canceled by calculating the difference between the two pieces of information. However, data of a portion where reflection and absorption are different between the first wavelength and the second wavelength is not canceled even by calculating the difference between the two images. In this way, the spectrum analysis of the substance in the inspection region can be performed using the difference in the rate of terahertz wave absorption by the substance. The type of the substance can be estimated using the spectrum analysis. In addition, since scattering or reflection by clothes is canceled, an unnecessary signal from the clothes can be reduced from the obtained image information, and the signal-to-noise ratio of the image can be improved.

If the inspection target person holds a substance that readily absorbs the first wavelength, the substance detected in the inspection region can be classified based on the difference in the absorption rate between the first wavelength and the second wavelength (step S436). As for the classification, when the relationship between a specific substance and a wavelength is held in a database 409, a determination unit 408 can perform the classification based on the database 409. The determination unit 408 may perform the classification using a model created by machine learning. With the above-described method, it is possible to estimate that the inspection target 410 holds the substance that absorbs the specific wavelength. It is known that dangerous substances exist among the substances that absorb a terahertz wave of a specific wavelength. The existence of a dangerous substance can be estimated by spectrum analysis.

The detection accuracy can be raised by accumulating a plurality of spectrum analysis results (step S437). It is thus determined that the inspection target 410 may hold a dangerous substance (step S438). As for the determination, determination based on the accumulation result of classifications may be performed based on a model by machine learning. If it is determined that a dangerous substance is held, the processing system notifies the outside that the inspection target 410 holds a dangerous substance. When the inspection target 410 passes through a gate in which the processing system is arranged, the processing system may notify the outside of a warning. When the person of the inspection target 410 puts in a ticket and passes through a ticket gate, the processing system may link the ticket with the inspection target 410 and notify the outside of the person as a monitoring target. As for the wavelength of the terahertz wave irradiated from the second illumination source 411, a plurality of illumination sources capable of irradiating terahertz waves of a plurality of, that is, three or more wavelengths may be combined in accordance with the absorption spectrum of a substance to be detected. When the determination is suspended, the inspection is repeated until the end condition is satisfied. The end condition may be the number of repetitions of the inspection (S439).

Third Embodiment

Figure 5:
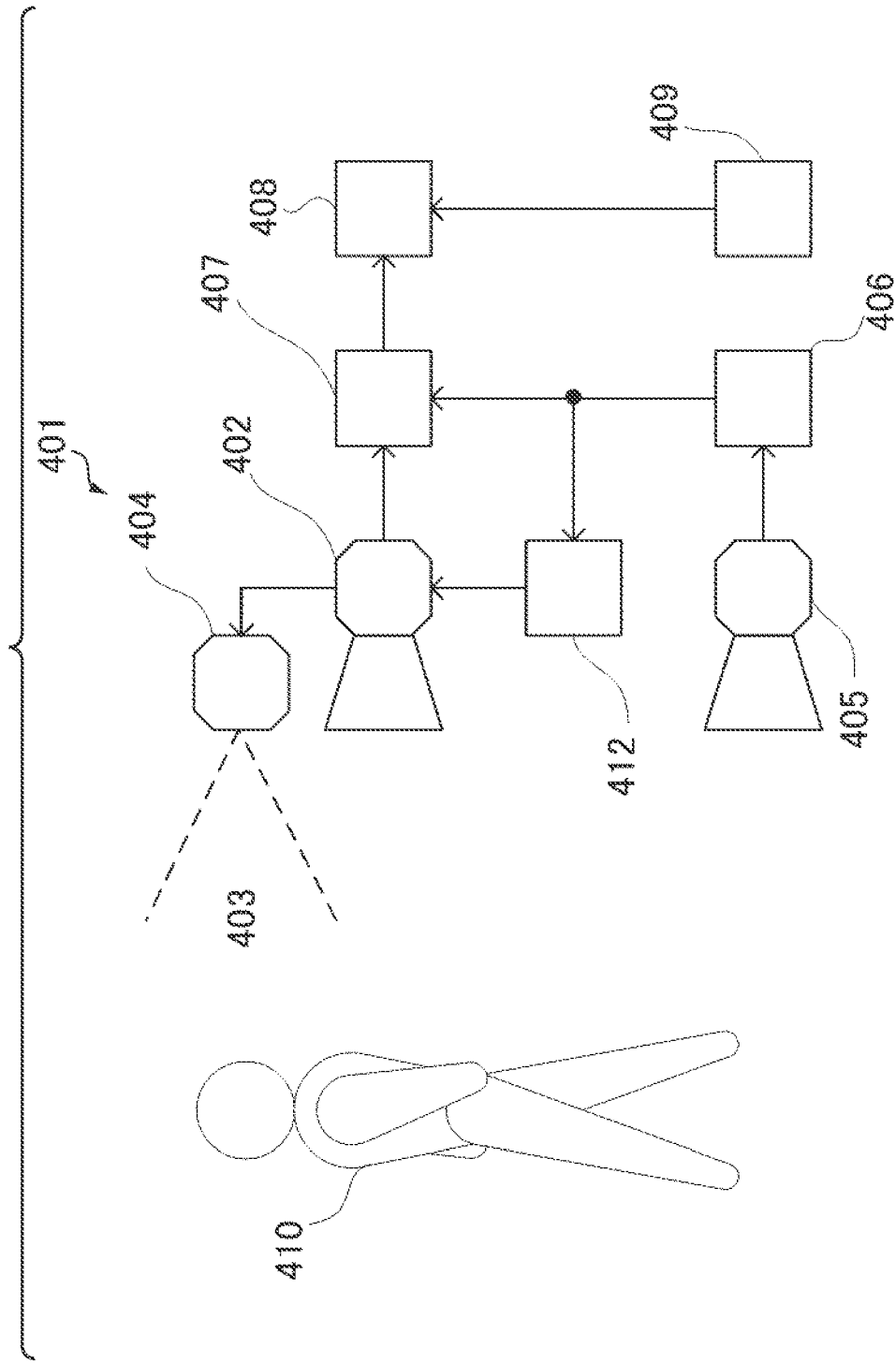
FIG. 5 is a conceptual view of a processing system according to the third embodiment.
Figure 6:
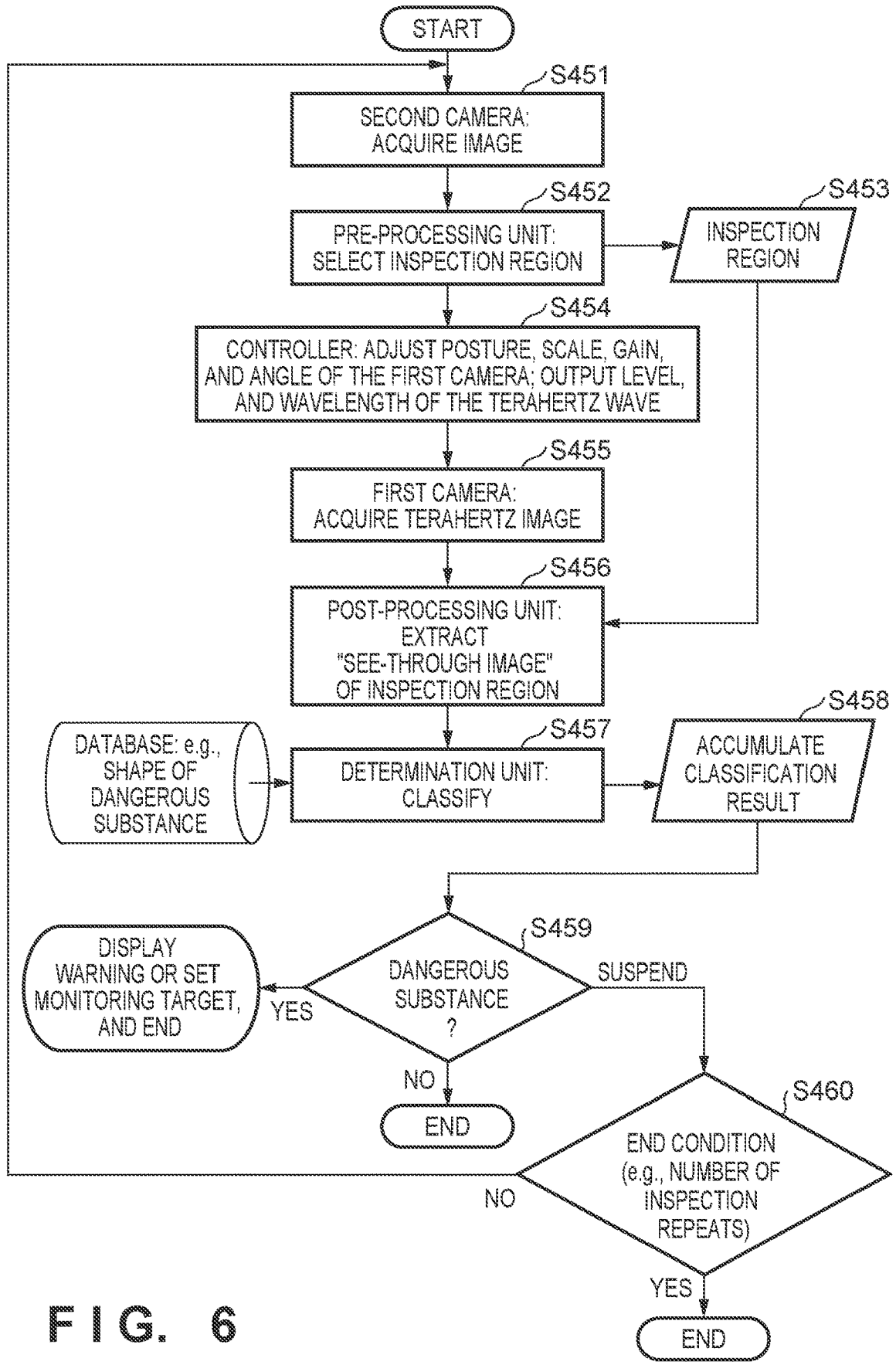
FIG. 6 is a flowchart of processing according to the third embodiment.

In this embodiment, based on detection of a specific region in a second image captured by a second imaging system a control unit 412 is controlled to control a first illumination source 404 and a first camera 402 in a first imaging system. This embodiment will be described with reference to FIGS. 5 and 6.

A second camera 405 of the second imaging system acquires a second image from an electromagnetic wave of a wavelength different from a terahertz wave radiated from the first illumination source 404. As the electromagnetic wave of a different wavelength, visible light, infrared light, or a millimeter wave can be used. The second image acquired by the second camera 405 is processed by a pre-processing unit 406. The pre-processing unit 406 detects an inspection region from the second image (steps S452 and S453). Detection of the inspection region is performed as described in the first embodiment.

Conditions at the time of capturing by the first camera are controlled in accordance with the position and range of the inspection region detected from the second image and the state of the inspection region. The conditions include control of the posture of the first camera, control of a gain for an acquired image, and control of a capturing range for zooming or trimming and an angle of view (step S454). The output level (output power) and the wavelength of the terahertz wave irradiated from the first illumination source 404 may be changed in accordance with the strength of a reflected signal from the inspection region or a target object in the inspection region. By this control, the inspection accuracy can be raised. The first imaging system controlled by the control unit 412 acquires a first image based on the terahertz wave of a first wavelength (step S455). A post-processing unit 407 performs processing of the inspection region based on the acquired first image (step S456). After that, a determination unit 408 performs determination and classification of an object (steps S457, S458, and S459). When the processing system is a security monitoring system, a risk is determined based on the accumulation of classification results. If it is determined that an inspection target 410 holds a dangerous substance, the processing system notifies the outside that the inspection target 410 holds a dangerous substance. When the inspection target 410 passes through a gate in which the processing system is arranged, the processing system may notify the outside of a warning. When the inspection target 410 puts in a ticket and passes through a ticket gate, the processing system may link the ticket with the inspection target 410 and set the inspection target 410 to a monitoring target. When the determination is suspended, the inspection is repeated until the end condition is satisfied. The end condition may be the number of repetitions of the inspection (S460).

Capturing by the first camera 402 may be controlled by a model (artificial intelligence) created by machine learning from the second image acquired by the second camera 405. The method will be described in detail.

FIG. 12A is a view schematically showing a model for machine learning, that is, a learning model. In this example, a neural network including an input layer 481, an output layer 483, and at least one intermediate layer 482 is used as a learning model. Image data is input to the input layer 481. In addition, the output layer 483 can output the classification result of the object of the input image.

As a learning method of the learning model, supervisory data with a correct answer label can be used. That is, using a data group including a set of input image data and a label representing an inspection target region in the image data, the learning model is learned by a means such as backpropagation. Learning by deep learning may be performed using a CNN (Convolutional Neural Network) as a model.

The data for classification of the object is selected in accordance with the purpose of the control. To control zooming, supervisory data with a label representing that the object is small or large, or has an appropriate size is used. To control the gain, supervisory data with a label representing that exposure of the object is underexposure, appropriate exposure, or overexposure is used. To control to switch the wavelength used by the first camera 402, supervisory data in which an input image is associated with an appropriate wavelength band is used. Alternatively, to control the output of the first illumination source 404, supervisory data in which classification is done in accordance with the transmittance of the terahertz wave output from the first illumination source 404 is used. These supervisory data are merely examples, and are not limited to these. Learning may be performed by deep learning without supervisory data. In this case, learning can be performed by a means for evaluating a result of control in accordance with an output to an input.

FIG. 12B is a schematic view showing a method of controlling the first camera 402 using a learned model. As an input, a visible light image 487 is input. A learned model 488 can output information representing the presence/absence of an object of low sensitivity for a terahertz wave in a wavelength range detected by the first camera 402. In accordance with the result, control to increase the output of the first illumination source 404 is performed, thereby obtaining an image 489.

When determination using machine learning or artificial intelligence is performed in this way, the accuracy of detection of the target object using the first camera 402 can be made higher.

In addition, when detecting a specific target object from the first image, similarly, a model (artificial intelligence) created by machine learning may be used. In this case, as supervisory data for learning, an image of a terahertz wave having the same wavelength as the terahertz wave used by the first camera 402 for capturing is used.

Fourth Embodiment

In this embodiment, an environment monitoring unit 413 configured to monitor a humidity around a processing unit is provided. This embodiment will be described with reference to FIG. 7. A terahertz wave is readily absorbed by water vapor. A terahertz wave of a longer wavelength is hardly affected by water vapor. Hence, the environment monitoring unit 413 is provided to measure the humidity, and the imaging system is controlled so as to be hardly affected by the peripheral environment.

More specifically, if the environment monitoring unit 413 detects that the humidity has become high, the wavelength of a terahertz wave 403 radiated from a first illumination source 404 is switched to a wavelength longer than the wavelength currently under use. In accordance with the humidity, the wavelength may be switched to a wavelength (a region that exists near a wavelength of 1.2 mm or 0.75 mm, where attenuation of atmosphere is specifically small) hardly affected by water vapor. When the wavelength of the terahertz wave becomes long, the resolution of an image captured by the camera lowers. However, it is possible to reduce the influence of water vapor and continue inspection.

Fifth Embodiment

In this embodiment, capturing is performed using terahertz waves of different wavelengths. A second image is acquired using a terahertz wave of a second wavelength longer than the wavelength in capturing a first image, and an inspection region is detected from the second image. The inspection region may be detected as a region including an object of a predetermined shape using a model created by machine learning, or a region where the spectrum of a reflected wave of a predetermined wavelength changes may be detected as the inspection region.

This embodiment will be described with reference to FIG. 8. Based on the inspection region detected from the second image, image data of a region of the first image corresponding to the inspection region is processed. The first image captured by a terahertz wave of a first wavelength generated from a first illumination source 404 is capturing 1, and the second image captured by a terahertz wave of a second wavelength generated from an illumination source 411 is capturing 2. Since the image of capturing 1 is acquired using a terahertz wave of a wavelength shorter than that in capturing 2, the resolution is high, and the information amount is large. Hence, the shape of each object held by an inspection target 410 is clear in the image acquired by the terahertz wave. However, since the terahertz wave of a short wavelength is used, the depth of field is shallow, and the capturing is sensitive to a change in the posture of the inspection target 410. More specifically, depending on the posture of the inspection target 410, a partial shape is acquired as the shape of the object held by the inspection target 410. On the other hand, in the image obtained by capturing 2, since the wavelength of the terahertz wave is long, the resolution is low, and the shape of each object is not clear as compared to capturing 1. However, since the terahertz wave of a long wavelength is used, the depth of field is deep, and the capturing is insensitive to a change in the posture of the inspection target 410. More specifically, independently of the posture of the inspection target 410, the whole shape of the object held by the inspection target 410 is acquired. When capturing 2 of a low resolution is processed to specify the position of an object held by the inspection target 410, and the data of capturing 1 is processed based on the detected inspection region, the processing load can be reduced, and the processing can be performed at a higher speed. Hence, even if the inspection target 410 is moving, features of the inspection target 410 can be detected a plurality of times in a short moving distance during a short time, and the object under clothes can be estimated based on the detected features.

In addition, when the difference between capturing 1 and capturing 2 performed using terahertz waves of the two different wavelengths is calculated, reflection by clothes is canceled, and noise can be reduced from the obtained image information. More specifically, since scattering is the main component of reflection from whole clothes, the intensity difference is small, and the capturing is insensitive to a change in the posture of the inspection target 410 (random noise is added to the acquired image as a whole). For this reason, when the differential image between capturing 1 and capturing 2 is calculated, the signal of clothes is canceled. In addition, when the difference is calculated, an image based on the difference in the terahertz wave absorption rate of the substance through which the terahertz wave passes can be obtained. Hence, the shape of an object containing a substance other than a metal or ceramic as a component can be detected from the difference between the first image and the second image.

The object in the inspection region is estimated by a determination unit 408 by classifying the shape of the object detected from capturing 1. If the inspection target 410 moves, the shape of the object obtained from the image is often partial. Hence, the determination accuracy can be improved by accumulating a plurality of classification results and performing determination based on the accumulated classification results. In a case of a security monitoring system, a risk is determined based on the accumulation of classification results. If it is determined that the inspection target 410 holds a dangerous substance, the processing system notifies that the inspection target 410 holds a dangerous substance. When the inspection target 410 passes through a gate in which the processing system is arranged, the processing system may notify the outside of a warning. When the inspection target 410 puts in a ticket and passes through a ticket gate, the processing system may link the ticket with the inspection target 410 and set the inspection target 410 to a monitoring target.

Sixth Embodiment

Figure 9:
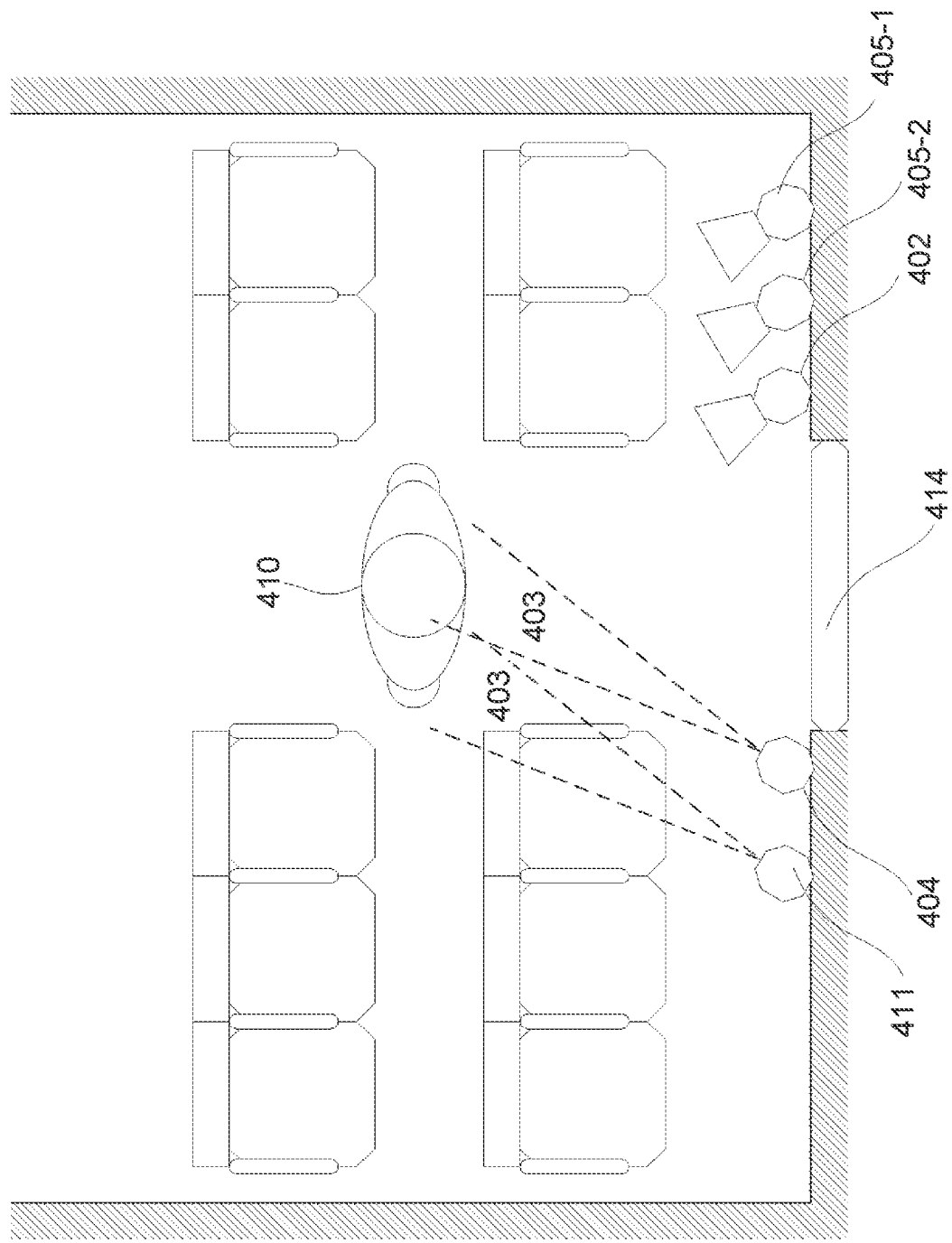
FIG. 9 is a view showing an arrangement example of the processing system.

An application example of the processing system will be described with reference to FIGS. 9 and 10. FIG. 9 shows an example in which a first illumination source 404 for a terahertz wave of a first wavelength and a second illumination source 411 of a second wavelength different from the first wavelength are arranged on one side of a doorway 414 of a vehicle or the like. A first camera 402 configured to perform capturing based on the terahertz wave of the first wavelength, a second camera 405-1 configured to perform capturing based on one of visible light, infrared light, and a millimeter wave, and a second camera 405-2 configured to perform capturing based on the terahertz wave of the second wavelength are arranged on the other side of the doorway 414. When the cameras and the illumination sources are combined, the processes concerning inspection described in the first to fifth embodiments can be performed in combination. An inspection target 410 can be tracked by the second camera 405-1, and the posture and the angle of view of the first camera 402 can be controlled. When the wavelength of the terahertz wave used for capturing by the second camera 405-2 configured to perform capturing based on a terahertz wave is set in accordance with the absorption rate of a substance, spectrum analysis can be performed. In addition, when the second cameras 405-1 and 405-2 are used to detect an inspection region, the processing load for a first image captured by the first camera 402 can be reduced. Furthermore, the shape of an object containing a substance other than a metal or ceramic as a component can be detected using the difference in the absorption rate of the substance for the wavelength of the terahertz wave. In this embodiment, as the second cameras 405, a camera for visible light, infrared light, or a millimeter wave and a camera for a terahertz wave of a second wavelength are used. However, only one of the camera for visible light, infrared light, or a millimeter wave and the camera for a terahertz wave of a second wavelength may be used as the second camera. The illumination sources and the cameras can unnoticeably be buried in a wall surface, a ceiling, or a floor surface. The illumination sources and the cameras may be arranged on both of the left and right sides of the doorway 414. When the illumination sources and the cameras are provided near the doorway 414, situations in which a plurality of inspection targets 410 overlap can be reduced, and the inspection accuracy can be improved.

An example in which the processing system is arranged near a ticket gate machine 415 installed at a ticket gate of a station will be described with reference to FIG. 10. The first illumination source 404 for a terahertz wave of a first wavelength and the second illumination source 411 of a second wavelength different from the first wavelength are arranged on one side of the ticket gate machine 415. The first camera 402 configured to perform capturing based on the terahertz wave of the first wavelength, the second camera 405-1 configured to perform capturing based on one of visible light, infrared light, and a millimeter wave, and the second camera 405-2 configured to perform capturing based on the terahertz wave of the second wavelength are arranged on the other side of the ticket gate machine 415. When the processing system is arranged near the ticket gate machine 415, situations in which a plurality of inspection targets 410 overlap can be reduced, and the inspection accuracy can be improved.

The operation of the processing system may be started in accordance with detection of a motion of the inspection target 410 by a sensor provided separately from the processing system opening/closing of a door of a vehicle, putting of a ticket into the ticket gate machine 415, or the like. A plurality of first cameras and second cameras may be provided. By using a plurality of cameras, the detection accuracy can be improved, the number of inspection targets can be increased, and the inspection region can be expanded.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-047789 filed Mar. 14, 2019 and No. 2020-032195 filed Feb. 27, 2020, which are hereby incorporated by reference herein in their entirety.

What is claimed is:

1. A processing system comprising:
a first imaging system configured to capture a first image based on a first terahertz wave from an inspection target, the first terahertz wave having a frequency within a range of 30 GHz to 30 THz;
a second imaging system configured to capture a second image of the inspection target based on a second terahertz wave having a wavelength longer than the first terahertz wave, the second terahertz wave having a frequency within a range of 30 GHz to 30 THz; and
a processor configured to process the first image and the second image,
wherein the processor detects an inspection region based on the second image and processes information of a region of the first image corresponding to the inspection region.

2. The system according to claim 1, wherein the processor calculates a difference between the information of the region of the first image corresponding to the inspection region and information of a region of the second image corresponding to the inspection region.

3. The system according to claim 1, wherein the system further comprising a control unit configured to control the first imaging system based on detection of the inspection region.

4. The system according to claim 3, wherein the control unit controls, at least one of a posture of a camera of the first imaging system, a gain of the camera, a capturing range of the camera, an output of the terahertz wave, and a wavelength of the terahertz wave.

5. The system according to claim 3, wherein the system further comprising an environment monitoring unit configured to measure an environment on a periphery,
wherein the control unit controls at least one of the wavelength and the output of the radiated terahertz wave in accordance with an output of the environment monitoring unit.

6. The system according to claim 1, wherein the system further comprising a plurality of illumination sources for capturing.

7. The system according to claim 1, wherein at least one of the first imaging system and the second imaging system comprises a plurality of cameras for capturing.

8. The system according to claim 1, wherein capturing of the first image, capturing of the second image, and the processing are repetitively performed.

9. The system according to claim 1, wherein the detection of the inspection region is based on one of a shape of the inspection region and information of a spectrum detected from the inspection region.

10. The system according to claim 1, wherein the system further comprising a determination unit configured to determine a risk concerning the inspection target in accordance with an output of the processor.

11. The system according to claim 1, wherein the processor detects the inspection region in the second image based on a learned model learned using at least one of deep learning and machine learning.

12. The system according to claim 1, wherein a difference between a frequency of the first terahertz wave and a frequency of the second terahertz wave is 0.3 THz or more.

13. The system according to claim 12, the frequency of the first terahertz wave is about 0.8 THz and the frequency of the second terahertz wave is about 0.5 THz.

14. The system according to claim 1, wherein the difference between the first image and the second image is calculated to reduce noise.

15. A processing system comprising:
a first imaging system configured to capture a first image based on a first terahertz wave from an inspection target, the first terahertz wave having a frequency within a range of 30 GHz to 30 THz;
a second imaging system configured to capture a second image of the inspection target based on a second terahertz wave having a wavelength longer than the first terahertz wave, the second terahertz wave having a frequency within a range of 30 GHz to 30 THz;
a control unit configured to control the first imaging system; and
a processor configured to process the second image,
wherein the control unit controls the first imaging system based on a result of the processing performed by the processor for the second image.

16. The system according to claim 15, wherein the control unit controls a condition at the time of capturing of the first image by the first imaging system based on the result of the processing performed by the processor for the second image, and
the condition includes one or a plurality of conditions selected from a posture of a camera of the first imaging system, zooming of the camera of the first imaging system, an angle of view of the camera of the first imaging system, a gain for the first image, and a range of trimming for the first image.

17. The system according to claim 15, wherein the system further comprising an illumination source configured to radiate the terahertz wave,
wherein the control unit controls at least one of a wavelength and an output of the terahertz wave radiated from the illumination source based on the result of the processing.

18. The system according to claim 15, wherein the system further comprising a plurality of illumination sources for capturing.

19. The system according to claim 15, wherein at least one of the first imaging system and the second imaging system comprises a plurality of cameras for capturing.

20. The system according to claim 15, wherein the system further comprising a determination unit configured to determine a risk concerning the inspection target in accordance with an output of the processor.

21. The system according to claim 15, wherein the processor performs the processing for the second image based on a learned model learned using at least one of deep learning and machine learning.

* * * * *